United States Patent
Barbier (10) Patent No.: US 12,187,096 B2
(45) Date of Patent: *Jan. 7, 2025

(54) CONTROL DEVICE, AND ASSOCIATED HEATING AND/OR VENTILATION AND/OR AIR CONDITIONING INSTALLATION, MOTOR VEHICLE AND TEMPERATURE MANAGEMENT METHOD

(71) Applicant: Valeo Systemes Thermiques, Le Mesnil Saint-Denis (FR)

(72) Inventor: Thierry Barbier, Le Mesnil Saint-Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 431 days.

This patent is subject to a terminal disclaimer.

(21) Appl. No.: 17/596,453

(22) PCT Filed: Jun. 10, 2020

(86) PCT No.: PCT/EP2020/066151
§ 371 (c)(1),
(2) Date: Dec. 10, 2021

(87) PCT Pub. No.: WO2020/249650
PCT Pub. Date: Dec. 17, 2020

(65) Prior Publication Data
US 2022/0305875 A1    Sep. 29, 2022

(30) Foreign Application Priority Data
Jun. 13, 2019 (FR) ...................... 1906340

(51) Int. Cl.
*B60H 1/00* (2006.01)
*G05B 19/414* (2006.01)

(52) U.S. Cl.
CPC ....... *B60H 1/0065* (2013.01); *B60H 1/00028* (2013.01); *B60H 1/00064* (2013.01);
(Continued)

(58) Field of Classification Search
CPC .............. B60H 1/0065; B60H 1/00028; B60H 1/00064; B60H 2001/00135;
(Continued)

(56) References Cited

U.S. PATENT DOCUMENTS 6,220,517 B1    4/2001 Ichishi et al.
6,244,952 B1 *  6/2001 Arold .................. B60H 1/3407
                                              454/145
(Continued)

FOREIGN PATENT DOCUMENTS

FR    2905898 A1    3/2008

OTHER PUBLICATIONS

Office Action issued in counterpart Chinese Patent Application No. 202080035802.X mailed Dec. 9, 2023 (15 pages).

*Primary Examiner* — Md Azad
(74) *Attorney, Agent, or Firm* — Osha Bergman Watanabe & Burton LLP (57) ABSTRACT

The invention concerns a control device (1) for a heating and/or ventilation and/or air conditioning installation of a motor vehicle, the installation comprising an air treatment unit (9) comprising air outlets intended to open into a zone (ZG, ZD) of the passenger compartment of the vehicle, including at least first and second air outlets, and at least first (21) and second (23, 25) members for mixing the air flow. According to the invention, the device (1) comprises a user interface (5) comprising at least first (51) and second (53) control members, and a control circuit (7) for receiving, from each control member (51, 53), an input signal with its own temperature setpoint, and for delivering separate con- (Continued)

trol signals for controlling the first and second mixing members (21, 23, 25).

10 Claims, 6 Drawing Sheets

(52) U.S. Cl.
CPC .. *G05B 19/414* (2013.01); *B60H 2001/00135* (2013.01); *B60H 2001/00185* (2013.01); *B60H 2001/00192* (2013.01); *G05B 2219/50333* (2013.01)

(58) Field of Classification Search
CPC ........... B60H 2001/00185; B60H 2001/00192; G05B 19/414; G05B 2219/50333
USPC ........................................................ 700/300
See application file for complete search history.

(56) References Cited

U.S. PATENT DOCUMENTS

| | | | | |
|---|---|---|---|---|
| 6,386,965 | B1* | 5/2002 | Greenwald | B60H 1/00871 |
| | | | | 165/41 |
| 2006/0116061 | A1 | 6/2006 | Alberternst et al. | |
| 2013/0098595 | A1* | 4/2013 | Schall | A45F 3/10 |
| | | | | 236/12.15 |
| 2017/0008371 | A1* | 1/2017 | Reichel | B60H 1/00678 |
| 2017/0096048 | A1* | 4/2017 | Larson | B60H 1/00785 |
| 2017/0334263 | A1* | 11/2017 | Schumacher | B60H 1/00292 |

\* cited by examiner

CONTROL DEVICE, AND ASSOCIATED HEATING AND/OR VENTILATION AND/OR AIR CONDITIONING INSTALLATION, MOTOR VEHICLE AND TEMPERATURE MANAGEMENT METHOD

FIELD OF THE INVENTION

The present invention lies in the field of motor vehicles, in particular heating and/or ventilation and/or air-conditioning installations for motor vehicles. The invention relates in particular to a control device for such an installation. The invention also relates to a motor vehicle having such an installation. The invention also relates to a temperature management method implemented by such a control device.

BACKGROUND OF THE INVENTION

Thermal comfort for the occupants of an interior of a motor vehicle is generally obtained by acting on an air flow intended to be blown into the vehicle interior through various air vents, in particular toward the windshield for defrosting or demisting for example, toward a top part of the occupants' bodies, or in the region of the occupants' feet.

A motor vehicle is commonly equipped with a heating and/or ventilation and/or air-conditioning installation for regulating the aerothermal parameters of an air flow intended to be distributed into the vehicle interior. Such an installation is commonly referred to as HVAC (for Heating, Ventilation and Air-Conditioning).

This installation generally comprises an air treatment housing delimited by partitions in which openings are provided, including at least one air inlet and at least one air outlet intended to open into a given region of the vehicle interior, in particular through the various air vents.

The air treatment housing generally accommodates thermal treatment means, such as heat exchangers, for heating and/or cooling the air flow before it is distributed into the vehicle interior. By way of example, the thermal treatment means may comprise an evaporator intended to cool and dehumidify the air flow passing through it, and also a heating means, in particular a radiator, optionally associated with an electric heating device, also known as an additional radiator, which is intended to heat the air flow that passes through it.

Mixing members are arranged in the air treatment housing in order to adjust the temperature of the air flow intended to be distributed. To this end, these mixing members are controlled so as to define the proportion of cold air flow and of hot air flow to be distributed into the vehicle interior. These are, for example, mixing flaps that are movable between at least two extreme positions.

It is known practice to provide, in the air treatment housing, at least one mixing chamber provided with such a mixing member for defining the proportion of one or more cold and/or hot air flows that pass into the mixing chamber. This mixing chamber serves to mix the air flows such that the air flow produced by mixing, having the desired setpoint temperature, is distributed toward the interior of the motor vehicle.

According to the known solutions, the management of the thermal comfort in the vehicle interior is based on focused control of the supply of heat toward the top of the vehicle occupants' bodies. Thus, when the installation operates in a mode for delivering an air flow toward the air vents at the top of the occupants' bodies and feet, the temperature is controlled in a common manner so as to deliver an air flow bound for the top of the occupants' bodies that is the same as or similar to the temperature setpoint, while the temperature of the air flow bound for the feet may be higher. Thus, to control the temperature in the vehicle interior to for example around 20° C. or 25° C., the air flow delivered at the air vents toward the top of the body is at an adjusted temperature of about 20-25° C., while the air flow bound for the feet may for example, depending on the operating modes of the installation, be delivered at a temperature 5° C. to 15° C. greater than the temperature of the air flow delivered toward the top of the vehicle occupants' bodies.

The occupants of the vehicle may be bothered by such a temperature difference and find themselves in a position of thermal discomfort, for example being too hot at their feet compared with the rest of the body.

However, because the mixing members are controlled as a whole, any change in temperature control brings about a modification both of the temperature of the air flow delivered toward the feet and of the air flow delivered to the air vents at the top part of the vehicle occupants' bodies. Consequently, the occupants are unable to find thermal comfort.

Therefore, there is a need to improve thermal management in the interior of the vehicle.

BRIEF SUMMARY OF THE INVENTION

The objective of the invention is to at least partially remedy these drawbacks of the prior art by providing a simple solution for adjusting the temperature so as to be better suited to the needs of the passengers of a motor vehicle.

To this end, an object of the invention is a control device for a heating and/or ventilation and/or air-conditioning installation of a motor vehicle comprising an interior, said installation comprising an air treatment housing having at least two air outlets intended to open into a zone of the vehicle interior, including at least a first defrosting and/or ventilation air outlet and at least one second air outlet at foot level, and at least one first and at least one second member for mixing the air flow in order to produce an air flow at an adjusted temperature bound for said first and/or second air outlet. According to the invention, said device has a user interface configured to be arranged in the vehicle interior, comprising at least one first control member for setting the temperature of a first air flow bound for said first air outlet and at least one second control member for setting the temperature of a second air flow bound for said second air outlet. In addition, said device has a control circuit configured to receive, from each control member, an input signal with an individual temperature setpoint, and to output separate control signals for controlling said first and second mixing members, so as to independently adjust the temperature of the first and second air flows bound for said first air outlet and said second air outlet, respectively.

Such a device allows independent temperature control for the first air flow at the first, defrosting and/or ventilation air outlet, in a top region of the vehicle interior, and for the second air flow at the second air outlet at foot level, in a bottom region of the vehicle interior. These are a top region and a bottom region of one and the same zone of the vehicle interior. It is thus possible for the user themselves to set and choose the temperature they desire at the top and bottom. The terms top and bottom are defined with respect to a vertical axis of the motor vehicle.

Said device may also have one or more of the following features, considered separately or in combination.

According to one embodiment, the user interface is configured to be arranged in a vehicle interior having at least two zones. This user interface comprises at least two first control members for setting the temperature of a first air flow bound for at least one first air outlet for each zone of the vehicle interior, and at least two second control members for setting the temperature of a second air flow bound for at least one second air outlet for each zone of the vehicle interior. This is the case in particular for an installation allowing left right and/or front rear separation, allowing independent temperature control for each zone of the vehicle interior and for the top and bottom regions of each zone.

According to one aspect of the invention, the control circuit is configured to output separate control signals for the independent control of at least one first actuator of said at least one first mixing member in a first mixing chamber of said housing, and of at least one second actuator of said at least one second mixing member in a second mixing chamber of said housing.

According to another aspect, the control circuit is configured to receive at least one input signal for activating an operating mode of said installation for separate management of the air flow bound for said at least one first air outlet and for said at least one second air outlet, and to output at least one control signal for controlling the movement of at least one separating member arranged in said housing into a position separating the first and second mixing chambers.

According to yet another aspect, the control circuit is configured to output at least one control signal for controlling the position of at least one member for placing in communication at each air outlet such that the first mixing chamber is in communication with said at least one first air outlet, and such that the second mixing chamber is in communication with said at least one second air outlet.

The control members can be chosen from at least one control knob or setting knob such as a rotary knob, or a touch surface such as a touch screen or a touch pad.

A further subject of the invention is a heating and/or ventilation and/or air-conditioning installation having:
- an air treatment housing having at least two air outlets intended to open into a zone of the vehicle interior, including at least a first defrosting and/or ventilation air outlet and at least one second air outlet at foot level, and
- at least one first and one second member for mixing the air flow that are arranged in said housing in order to produce an air flow at an adjusted temperature bound for said first and/or second air outlet.

According to the invention, said installation has a device as defined above for controlling said first and second mixing members independently of one another, depending on an individual temperature setpoint, so as to deliver a first air flow at a first adjusted temperature bound for said first air outlet and/or a second air flow at a second adjusted temperature bound for said second air outlet.

The first temperature of the first air flow may be the same as or different than the second temperature of the second air flow.

Said installation may also have one or more of the following features, considered separately or in combination.

According to one aspect of the invention, said installation is intended to be mounted in a motor vehicle with an interior having at least two zones, for example left and right, front and rear. Said installation comprises, for each zone, at least one first defrosting and/or ventilation air outlet and at least one second air outlet at foot level. The control circuit is configured to output separate control signals for controlling each mixing member, so as to independently adjust the temperature of the air flow bound for each air outlet, in a top region and in a bottom region of each zone of the vehicle interior.

According to another aspect of the invention, said installation has at least one heat exchanger, such as an evaporator, a heating device such as a radiator, and, according to one option, an additional electric heating device.

Said installation may have at least one separating wall arranged in an air duct of said housing so as to separate the air duct into a first part having said at least one first air outlet and a second part having said at least one second air outlet. Said at least one first mixing member is arranged in the first part of the air duct and said at least one second mixing member is arranged in the second part of the air duct.

According to one embodiment, said installation has at least one first and at least one second mixing chamber, each comprising at least one member for mixing the air flow in order to produce an air flow at an adjusted temperature, and at least one first actuator for said at least one first mixing member in a first mixing chamber of said housing, and at least one second actuator for said at least one second mixing member in the second mixing chamber, these being configured to be controlled independently of one another by the control circuit.

The independently controllable actuators make it possible to each adjust, at an associated mixing chamber, the temperature bound for the top region and bound for the bottom region of the vehicle interior as selected by the user.

According to one embodiment, said installation has, for each air outlet, at least one member for placing in communication with a mixing chamber, and at least one actuator configured to be controlled by the control circuit so as to control the position of said at least one member for placing in communication.

The mixing members may be realized in the form of flaps.

The members for placing in communication may be realized in the form of flaps and/or of fixed or movable walls.

The invention also relates to a motor vehicle having a heating and/or ventilation and/or air-conditioning installation as defined above.

The invention also relates to a method for managing the temperature in a motor vehicle interior by way of a control device as defined above of such a heating and/or ventilation and/or air-conditioning installation, involving the following steps:
- selecting, by way of at least one control member, a temperature of an air flow to be delivered via at least one air outlet associated with said control member,
- receiving at least one input signal from said control member, and
- outputting a control signal for controlling at least one mixing member so as to adjust the temperature of the air flow bound for said at least one associated air outlet.

In particular, said method may involve the following steps:
- selecting, by way of a first control member, a first temperature of a first air flow to be delivered via at least one first air outlet,
- selecting, by way of a second control member, a second temperature of a second air flow to be delivered via at least one second air outlet,
- receiving at least one input signal from the first control member,
- receiving at least one input signal from the second control member, outputting a first control signal for controlling at least one first mixing member so as to adjust the temperature of the first air flow, outputting a second control signal, different than the first control signal, for controlling at least one second mixing member so as to adjust the temperature of the second air flow.

Such a method makes it possible to independently select the desired temperature, or to customize the temperature, for the top and bottom regions of the vehicle interior, and makes it possible to independently control the mixing members so as to deliver, at the air outlets, an optimal temperature in each, top and bottom, region of one and the same zone of the vehicle interior.

BRIEF DESCRIPTION OF THE DRAWINGS

Further advantages and features of the invention will become more clearly apparent from reading the following description, given by way of illustrative and nonlimiting example, and the appended drawings, in which.

DETAILED DESCRIPTION OF THE INVENTION

In these figures, identical elements bear the same reference numerals.

The following embodiments are examples. Although the description refers to one or more embodiments, this does not necessarily mean that each reference relates to the same embodiment, or that the features apply only to one embodiment. Individual features of different embodiments can also be combined or interchanged in order to create other embodiments.

In the description, certain elements may be indexed, such as first element or second element, for example. In this case, the index is simply used to differentiate and denote elements that are similar but not identical. This indexing does not imply that one element takes priority over another and such denominations can easily be interchanged without departing from the scope of the present description. This indexing does not imply an order in time either.

Figure 1:
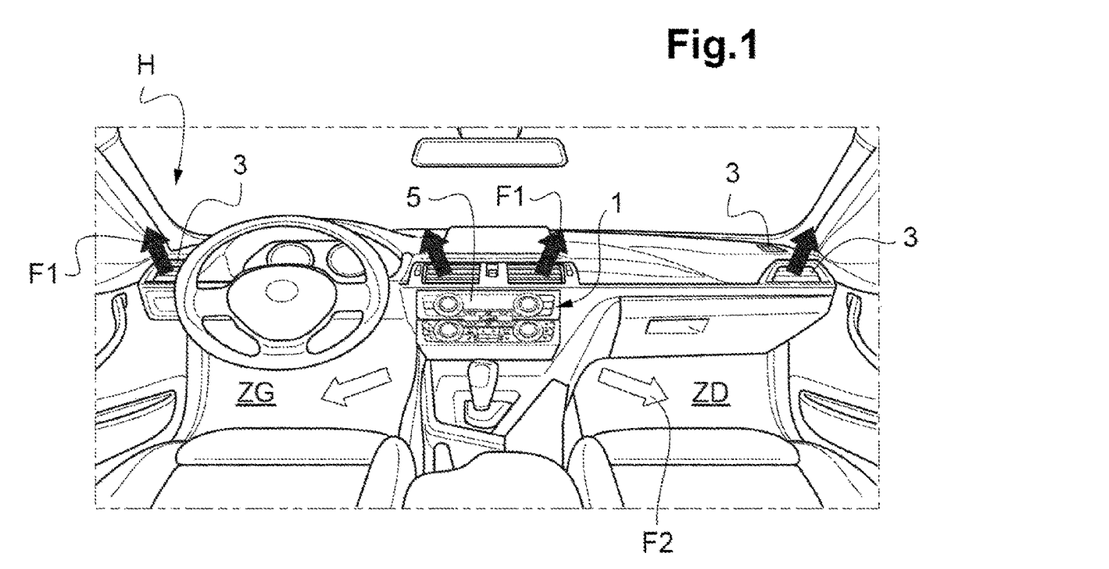
FIG. 1 schematically shows the inside of an interior of a motor vehicle provided with a device for controlling a heating and/or ventilation and/or air-conditioning installation according to the invention.

The invention relates to the management of the thermal comfort in an interior H of a motor vehicle schematically depicted in FIG. 1, with the aid of a control device 1 of a heating and/or ventilation and/or air-conditioning installation with which the vehicle is equipped. The vehicle interior H may form a single zone or, as a variant, have a plurality of zones, for example the left-hand zone ZG and right-hand zone ZD, and/or the front zone and rear zone.

A predefined number of air vents 3 are disposed in the vehicle interior H, for example in a top region and in a bottom region of the interior H, or in a top region and in a bottom region of each zone ZG, ZD of the interior H. Other positions for the air vents 3 (not shown) can be envisioned, for example at the sides.

When the installation is in operation, a first air flow, indicated by the arrows F1, can be delivered through the air vents 3 in the top region, for example toward the windshield and toward a top part of the vehicle occupants' bodies. As a variant or in addition, depending on the intended operating modes of the installation, a second air flow, indicated by the arrows F2, can be delivered through the air vents 3 in the bottom region, toward the vehicle occupants' feet.

The control device 1 has a user interface 5 configured to be arranged in the interior H of the vehicle. This user interface 5 allows an occupant of the vehicle to separately select the desired temperature in the top region or in the bottom region of the vehicle interior H. The terms top and bottom are defined with respect to a vertical axis (not shown) of the motor vehicle.

Figure 2:
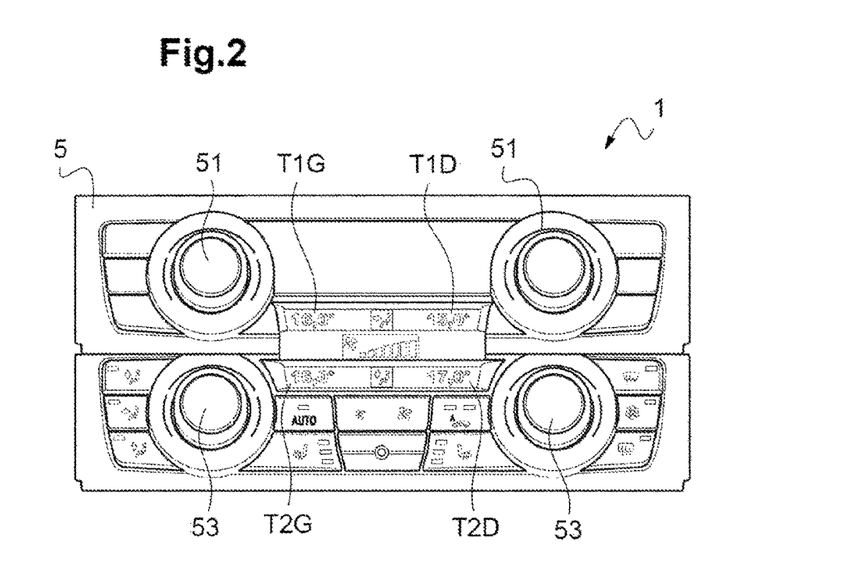
FIG. 2 schematically shows a user interface of the control device.

The user interface 5, which is more clearly visible in FIG. 2, has at least one first control member 51 for setting the temperature of the first air flow and at least one second control member 53 for setting the temperature of the second air flow.

Each pair of first and second control members 51, 53 may be dedicated to the management of the temperature in a given zone of the vehicle interior. According to the particular example shown, the user interface 5 has two first control members 51 and two second control members 53. In the example illustrated, with reference to the disposition of the elements in FIG. 2, the first and second control members 51, 53 situated on the left are dedicated to the management of the temperature in the left-hand zone of the vehicle interior, and those situated on the right are dedicated to the management of the temperature in the right-hand zone of the vehicle interior.

The first control member(s) 51 can be associated with the management of the temperature of the first air flow toward a top region of the vehicle interior, for example toward the top of the vehicle occupants' bodies. The second control member(s) 53 can be associated with the management of the temperature of the second air flow toward a bottom region of the vehicle interior, more specifically toward the vehicle occupants' feet. For example, the driver can use the first control member 51 on the left to select a first temperature T1G for the top region of the left-hand zone of the vehicle interior and use the second control member 53 on the left to select a second temperature T2G for the bottom region of the left-hand zone of the interior. A passenger can use the first control member 51 on the right to select a first temperature T1D for the top region of the right-hand zone of the vehicle interior and use the second control member 53 on the right to select a second temperature T2D for the bottom region of the right-hand zone of the interior. The first and second temperatures T1G, T2G and T1D, T2D selected may be identical or different.

Each control member 51, 53 may be realized for example in the form of a rotary knob. As a variant, it may be in the form of a touch surface, such as a touch screen or a touch pad.

The user interface 5 may also have at least one control member for activating different operating modes of the installation, in particular for dependent or separate management of the air flow bound for the different zones of the vehicle interior or for the top and bottom regions of a given zone.

Figure 3:
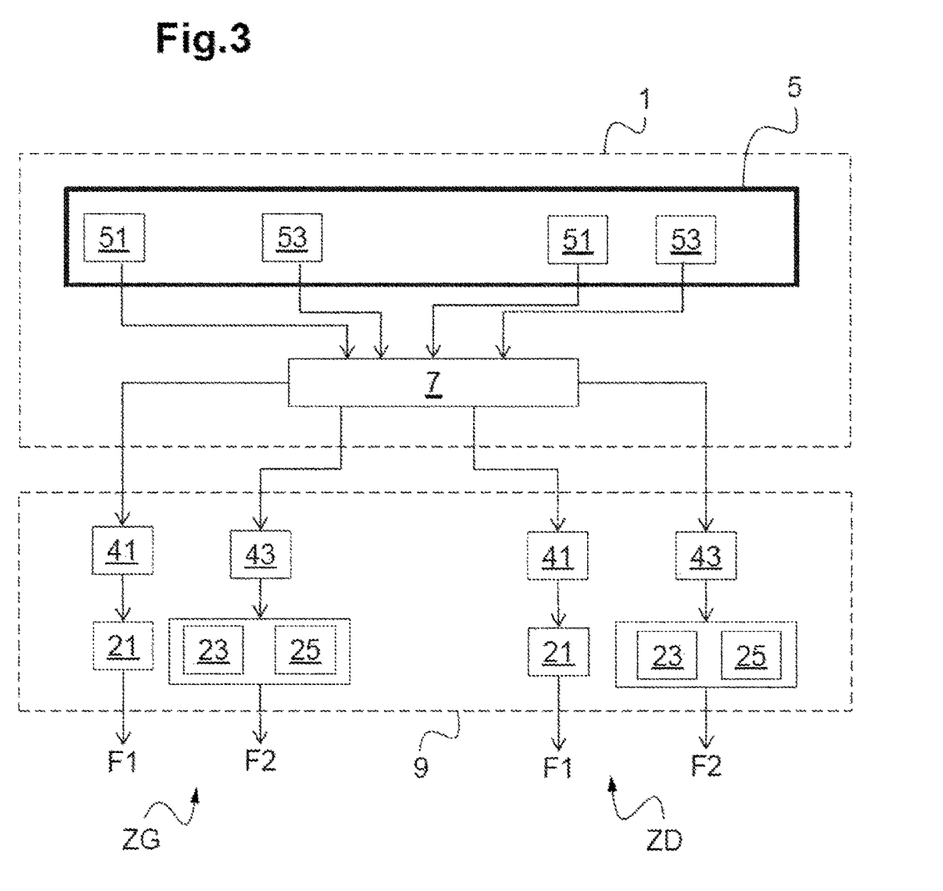
FIG. 3 is a block diagram showing the interaction between the control device and elements of an air treatment housing of the installation, for separate management of the temperature bound for a top region and for a bottom region of the vehicle interior.

As schematically shown in FIG. 3, the control device 1 also has a control circuit 7 connected on the input side to the user interface 5. It can thus receive input signals from the user interface 5. In particular, it can receive an input signal from each control member 51, 53, with an individual temperature setpoint. The control circuit 7 is connected on the output side to elements to be controlled that are described in more detail below.

Figure 4:
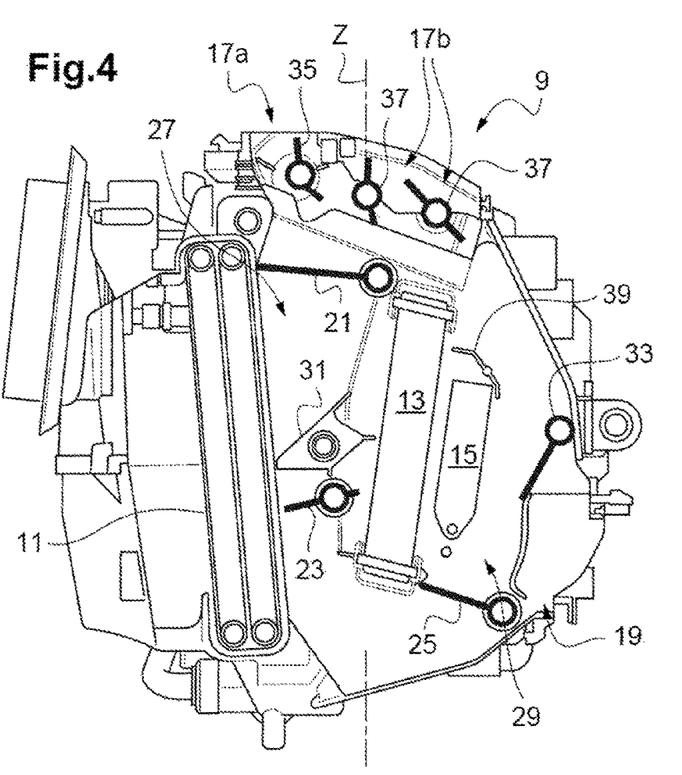
FIG. 4 is a cross-sectional view of an air treatment housing of the installation provided with heat exchangers and delimiting mixing chambers.

In particular, these are elements received in an air treatment housing 9 of the installation. FIG. 4 shows such an air treatment housing 9 configured to thermally treat the air flow coming from an air inlet housing of the installation for example.

To this end, the air treatment housing 9 delimits at least one air duct in which one or more thermal treatment means, such as heat exchangers, for heating and/or cooling the air flow before it is distributed into the vehicle interior are disposed. By way of example, the heat exchangers may comprise an evaporator 11 intended to cool and dehumidify the air flow passing through it, and also a heating device, in particular a radiator 13, optionally associated with an electric heating device, also known as an additional radiator 15, which are intended to heat the air flow. The heating devices 13, 15 are disposed downstream of the evaporator 11 in the direction of flow of the air flow.

The air treatment housing 9 has at least one first air outlet 17a, 17b and at least one second air outlet 19. The air outlets 17a, 17b, 19 may comprise air outlet ducts that lead to different openings or nozzles or air vents disposed at chosen locations in the vehicle interior.

According to the embodiment described, when the air treatment housing 9 is mounted in the vehicle, the first air outlet(s) 17a, 17b are intended to open out into a top region of the vehicle interior. This is for example a defrosting or demisting outlet 17a bound for an air vent or nozzle for defrosting/demisting the windshield, and one or more ventilation outlets 17b bound for air vents or ventilation nozzles oriented toward the top parts of the vehicle occupants, such as the face or the top of the body. The second air outlet(s) 19 are intended to open out into a bottom region of the vehicle interior. These are in particular air outlets 19 intended to open out at the vehicle occupants' feet.

Mixing members 21, 23, 25 are arranged in the air treatment housing 9 in order to adjust the temperature of the air flow intended to be distributed. To this end, these mixing members 21, 23, 25 are controlled so as to define the proportion of cold air flow and of hot air flow to be distributed into the vehicle interior. These are, for example, mixing flaps that are mounted so as to be movable between at least two extreme positions.

The installation has in particular at least one first member 21 for mixing the air flow that is arranged in the air treatment housing 9 in order to produce the first adjusted-temperature air flow bound for at least one of the first air outlets 17a, 17b. The installation also has at least one second member 23, 25 for mixing the air flow that is arranged in the air treatment housing 9 in order to produce the second adjusted-temperature air flow bound for at least one second air outlet 19.

Advantageously, the installation has at least one first mixing chamber 27 and at least one second mixing chamber 29. Each mixing chamber 27, 29 is provided with at least one mixing member 21, 23, 25 for defining the proportion of one or more cold and/or hot air flows passing into the respective mixing chamber 27, 29. Each mixing chamber 27, 29 serves to mix the air flows such that the air flow produced by mixing, having the desired setpoint temperature, is distributed toward the interior of the motor vehicle.

The first mixing chamber 27 is provided in a top part of the air treatment housing 9 while the second mixing chamber 29 is provided in a bottom part. The terms "top" and "bottom" are defined with reference to the Z axis shown in FIG. 4, forming a vertical axis.

In particular, the first mixing chamber 27 is provided downstream of the evaporator 11 in the direction of flow of the air flow. Thus, during operation, the air flow admitted into the air treatment housing 9 passes through the evaporator 11 and can then be admitted into the first mixing chamber 27 and/or be oriented toward the radiator 13 and optionally the additional radiator 15, in order to obtain a hot air flow.

The first mixing chamber 27 is provided with the first mixing member 21, such as a flap, in order to define the proportion of the cold air flow and of the hot air flow that passes into the first mixing chamber 27. This mixing member 21 thus makes it possible to adjust the temperature of the mixed air flow intended to be distributed.

The second mixing chamber 29 is arranged in aeraulic communication with the heating device(s) 13, 15. The second mixing chamber 29 is equipped with the second mixing member(s) 23, 25, such as flaps, in order to define the proportion of the cold air flow and of the hot air flow that passes into the second mixing chamber 29 in order to adjust the temperature of the air flow intended to be distributed.

In the example illustrated, the first mixing member 21 and one of the second mixing members, in this case the mixing member 23, are positioned upstream of the radiator 13. Alternatively, they can be positioned downstream of the radiator 13.

In at least one operating mode of the installation, the first mixing chamber 27 can supply one or the first air outlet(s) 17a, 17b with an adjusted-temperature air flow bound for the top region of the vehicle interior or for a given zone of the interior, while the second mixing chamber 29 can supply the second air outlet 19, known as the foot outlet, with an adjusted-temperature air flow bound for the bottom region of the vehicle interior or for the given zone of the interior.

As mentioned above, the ventilation of the top and bottom regions of the vehicle interior or of each zone of the interior can be done according to a separate command. In other words, a user can command a first setpoint temperature for the first air flow coming from the first mixing chamber 27, and can command a different second setpoint temperature for the second air flow coming from the second mixing chamber 29.

A separating element 31 can be arranged in the air treatment housing 9 so as to separate the air flow coming from the evaporator 11 into two separate air flows, each one being intended to be oriented toward a specific mixing chamber 27, 29. Each air flow can pass through a part of the radiator 13 or bypass it before arriving at the respective mixing chamber 27, 29, in suitable proportions to ensure the respective setpoint temperatures. The separating element 31 is arranged downstream of the evaporator 11 and upstream of the radiator 13 in the direction of flow of the air flow. The separating element 31 can, for example, be situated substantially half-way, along the Z axis, up the evaporator 11. The separating element 31 can, for example, be formed by a set of walls that are connected together. Alternatively, a single wall can be provided.

In order for it to be possible to place the two mixing chambers 27, 29 in communication or to make them independent of one another, another separating member, such as a separating flap 33, can be arranged between the two mixing chambers 27, 29. To this end, the separating flap 33 is arranged for example so as to be movable between a first extreme position placing the two mixing chambers 27, 29 in communication, and a second extreme position isolating the two mixing chambers 27, 29. The separating flap 33 is disposed downstream of the radiator 13 or of the additional radiator 15 when it is provided.

When the flap 33 is in the second position, the flap 33 and the separating element 31 are able to separate the air duct into a top first part having the first air outlets 17a, 17b and a bottom second part having the second air outlet 19. The first mixing chamber 27 and the first mixing member 21 are in the first part of the air duct. The second mixing chamber 29 and the second mixing members 23, 25 are arranged in the second part of the air duct.

In addition, one or more members for placing in communication, such as flaps and/or fixed or movable walls, can be provided so as to place the air outlets 17a, 17b, 19 in communication with a mixing chamber 27, 29. The flaps 33, 35, 37 are arranged so as to control or prevent access of the air flows to the different air outlets 17a, 17b, 19. The separating flap 33 can, for example, be configured to prevent access to the second air outlet 19 when it is in the position first extreme position placing the two mixing chambers 27, 29 in communication. In this embodiment, the flap 33 has a dual function of separating the mixing chambers and of opening/closing the outlet. Of course, the functions can be separated, i.e. carried out by different elements.

In one particular exemplary embodiment, a deflector 39, such as a rib, can be provided in the air treatment housing 9. The deflector 39 may, for example, be intended to cooperate with the separating flap 33 in at least one operating mode of the installation, such as a dual ventilation/feet mode. When the separating flap 33 is in an extreme position placing the second air outlet 19 in communication with the second mixing chamber 29 and providing separation between the two mixing chambers 27, 29, the separating flap 33 comes to bear against the deflector 39. In this position, the air flow exiting the radiator 13 can arrive in the first mixing chamber 27 without first of all passing through the additional radiator 15.

Figure 5:
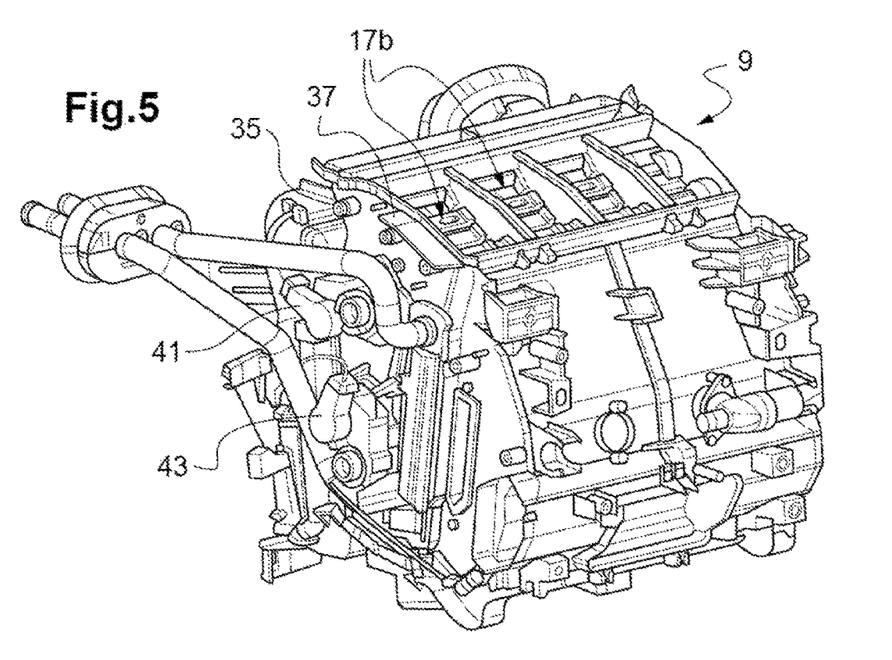
FIG. 5 is a first perspective view of the air treatment housing.
Figure 6:
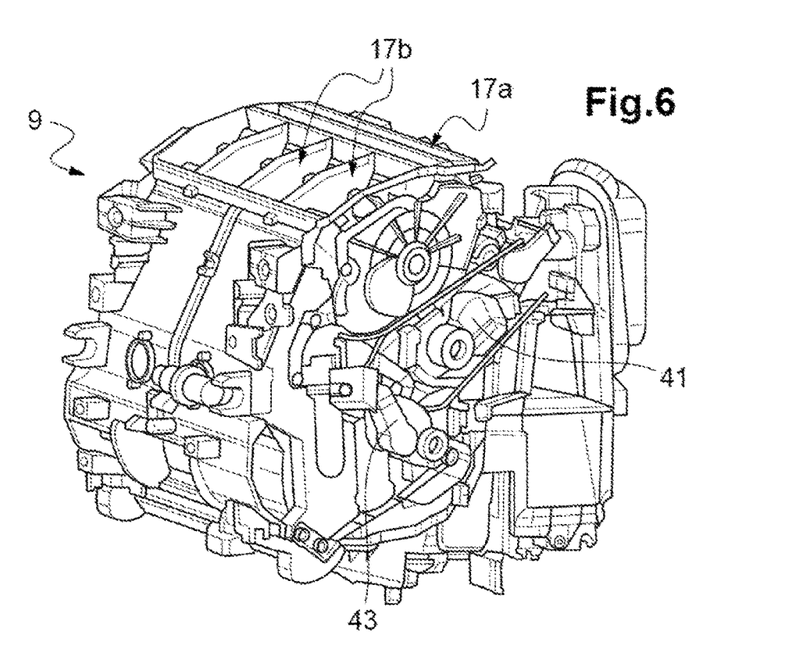
FIG. 6 is a second perspective view of the air treatment housing.

In order to set the mixing flaps 21, 23, 25 in motion, the installation has corresponding actuators. With reference to FIGS. 4 to 6, a first actuator 41 is configured to set the first mixing member 21 in motion. At least one second actuator 43 is configured to set the second mixing member(s) 23, 25 in motion. The first 41 and the second 43 actuators are configured to be controlled independently of one another via the control circuit 7 (FIG. 3). The actuators 41 and, respectively, 43, which are independently controllable, are each able to adjust the temperature of the air flow in the associated mixing chamber 27 and, respectively, 29.

In a vehicle allowing separate management for two zones of the vehicle interior, for example with a distinct left and right, at least four actuators 41, 43 can be provided, with at least one first and one second actuator 41, 43 for each zone.

A predefined number of actuators can also be provided to control the position of the flaps 33 to 37.

Referring again to FIGS. 3 and 4, the control circuit 7 is configured to deliver separate control signals for controlling the first mixing member independently of the control of the second mixing member(s) 23, 25, depending on an individual temperature setpoint, so as to independently adjust the temperature of the first air flow bound for the first air outlets 17a, 17b and of the second air flow bound for the second air outlet 19. More specifically, the control circuit 7 is configured to output separate control signals for controlling each actuator 41, 43, in order to control the position of the mixing members 21, 23, 25.

The control circuit 7 is also configured to receive at least one input signal for activating an operating mode of the installation. For example, a user can select a dual, top/bottom, mode for separate management of the air flow bound for one or the first air outlet(s) 17a, 17b and for the second air outlet 19. In this case, the control circuit 7 can output at least one control signal to control the movement of the flap 33 into a position separating the first and second mixing chambers 27, 29 so as to make them independent.

The control circuit 7 is also configured to output at least one control signal for controlling the position of the flaps 33 to 37 at each air outlet 17a, 17b, 19, such that the first mixing chamber 27 communicates with one or the first air outlet(s) 17a, 17b and such that the second mixing chamber 29 communicates with the second air outlet 19. In the example described, the separating flap 33 can be linked to the flaps 35 and 37. Alternatively, it can be independent of the latter and only have the function of separating the mixing chambers 27, 29. In this case, an additional flap can be provided at the second air outlet 19, thus forming a "foot" flap, and can be linked to the flaps 35 and 37 by kinematics.

Thus, with reference to all the figures, the temperature inside the vehicle interior H can be controlled by way of the control device 1, using a management method involving the steps set out below.

A preliminary step can be provided in which a user can select a dual operating mode of the installation with separate management of the first air flow at one or the first air outlet(s) 17a, 17b and of the second air flow F2 at the second air outlet 19. This step can be carried out by way of the user interface 5. In this case, the control circuit 7 can output at least one control signal to control the movement of the separating flap 33 into a position separating the first and second mixing chambers 27, 29 so as to make them independent, as illustrated in FIG. 7 or 8.

Figure 7:
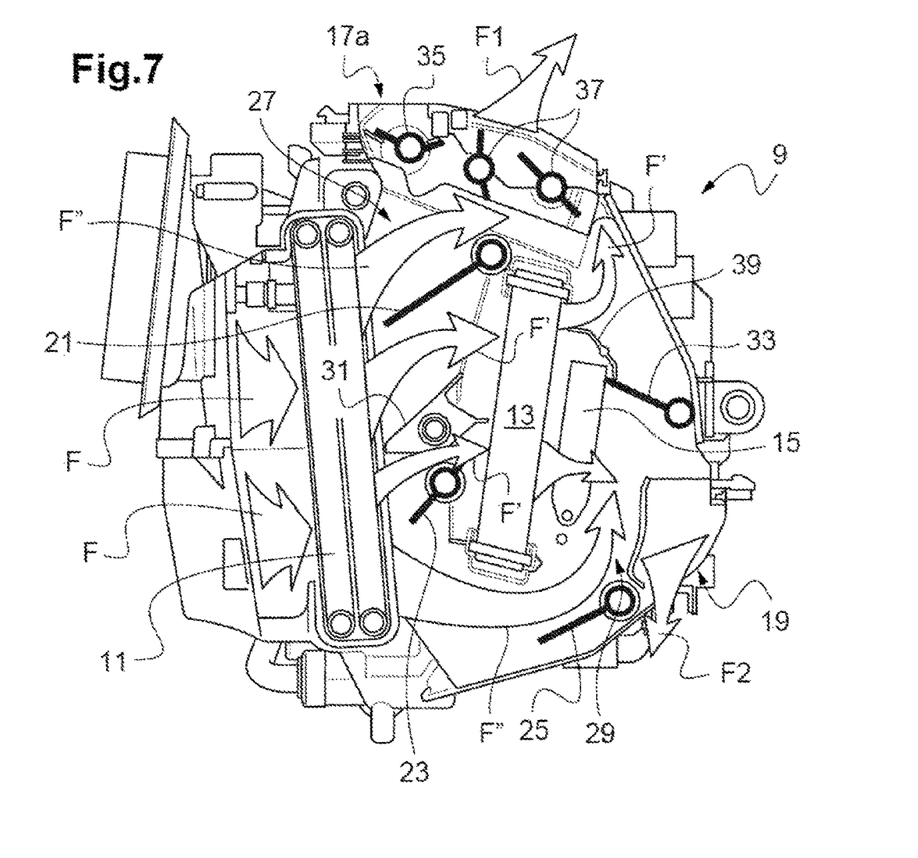
FIG. 7 is a schematic depiction showing the operation of the installation for distributing air into the vehicle interior in a first mode.

This may be, for example, a first dual, top/bottom, for example ventilation/feet, operating mode, with separate management for cooling/heating the air flow bound for one or first ventilation outlet(s) 17b intended to be oriented toward the occupants' faces or the tops of their bodies, and the air flow bound for the second air outlet 19 toward the feet (FIG. 7). In this case, the flap 35 is controlled so as to be placed in a position preventing access to the defrosting or demisting outlet 17a. The flaps 37 can be controlled to take up positions allowing the ventilation outlets 17b to be placed in communication with the first communication chamber 27. In this first operating mode, the separating flap 33 can be controlled into a position in which it frees up access to the second air outlet 19 by bearing against the deflector 39.

Figure 8:
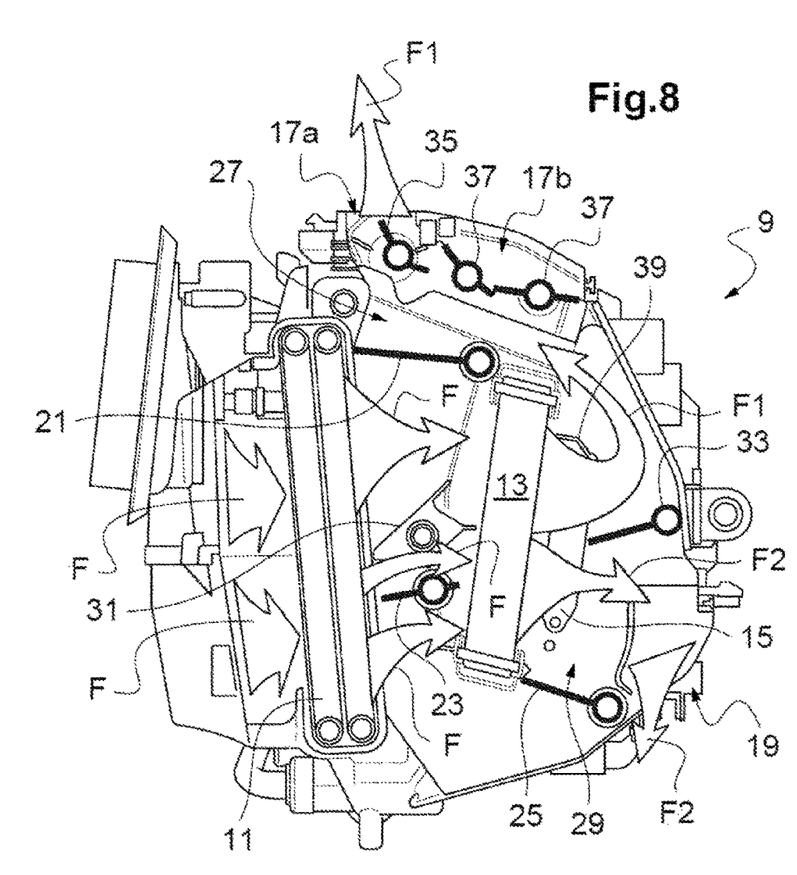
FIG. 8 is a schematic depiction showing the operation of the installation for distributing air into the vehicle interior in a second mode.

In a variant, this can be a second, demisting/defrosting and feet, operating mode, with separate management of the air flow bound for the first, defrosting or demisting outlet 17a and of the air flow bound for the second air outlet 19 toward the occupants' feet (FIG. 8). In this case, the flap 35 is controlled so as to be placed in a position placing the defrosting or demisting outlet 17a in communication with the first communication chamber 27. The flaps 37 can be controlled to take up positions for preventing access to the ventilation outlets 17b. In this second operating mode, the separating flap 33 can be controlled into an intermediate opening position in which it frees up access to the second air outlet 19 without bearing against the deflector 39.

A user, such as the driver or a passenger, can select, by way of at least one control member 51, 53, a temperature of an air flow to be delivered via at least one air outlet 17a, 17b, 19 associated with the control member 51, 53. For example, the user can select, by way of a first control member 51, a first temperature T1G, T1D of the first air flow F1 to be delivered via a first air outlet 17a when defrosting or demisting is desired (FIG. 8), and/or a first air outlet 17b for ventilation oriented toward the face or the top of the user's body (FIG. 7). The user can select, by way of a second control member 53, a second temperature T2G, T2D of the second air flow F2 to be delivered via a second air outlet 19 for oriented ventilation toward the user's feet.

The control circuit 7 can receive the input signal(s) from the or each control member 51, 53 actuated by the user, and deliver at least one control signal for controlling a mixing member, so as to adjust the temperature of the air flow bound for the associated air outlet.

When a first control member 51 is actuated, the control circuit 7 can deliver a first control signal for controlling the first mixing member 21, so as to adjust the temperature of the first air flow bound for the first air outlet 17a (FIG. 8) and/or 17b (FIG. 7).

When a second control member 53 is actuated, the control circuit 7 can deliver a second control signal, different than the first control signal, for controlling at least one second mixing member 23, 25, so as to adjust the temperature of the second air flow F2 bound for the second air outlet 19.

Thus, in the first operating mode in FIG. 7, an air flow F admitted into the air treatment housing 9 can pass through the evaporator 11. The first mixing flap 21 can be controlled such that, on leaving the evaporator 11, a part of the air flow F' can be oriented toward the radiator 13 in order to pass through the latter so as to be heated before arriving at the first mixing chamber 27, and another part of the cold air flow F" leaving the evaporator 11 can be oriented directly toward the first mixing chamber 27 without passing through the radiator 13. The hot and cold air flows are mixed in the first mixing chamber 27. The first air flow F1 brought about by mixing is at a first adjusted temperature and can be distributed via the first ventilation air outlets 17b.

The second mixing flaps 23, 25 can be controlled such that, on leaving the evaporator 11, a part of the air flow F' can be oriented toward the radiator 13 in order to pass through the radiator 13 and the additional radiator 15 so as to be heated before arriving at the second mixing chamber 29. Another part of the cold air flow F" leaving the evaporator 11 can be oriented directly toward the second mixing chamber 29, bypassing the radiator 13. The hot F' and cold F" air flows are mixed in the second mixing chamber 29. The second air flow F2 brought about by mixing is at a second adjusted temperature and can be distributed via the second air outlet 19.

The temperature of the first air flow F1 may be the same as or different than that of the second air flow F2.

In the second operating mode in FIG. 8, as before, the air flow F admitted into the air treatment housing 9 can pass through the evaporator 11. The first mixing flap 21 can be controlled such that the air flow leaving the evaporator 11 is oriented toward the radiator 13 in order to pass through the latter so as to be heated. The hot first air flow F1 can then arrive at the first mixing chamber 27 and be distributed via the first, defrosting or demisting air outlet 17a.

The second mixing flaps 23, 25 can be controlled such that, on leaving the evaporator 11, the air flow F can be oriented toward the radiator 13 in order to pass through it so as to be heated. The hot second air flow F2 can then arrive at the second mixing chamber 29 and be distributed via the second air outlet 19.

Thus, the air flow F upstream of the radiator 13 is separated by the partition 31 upstream of the radiator 13. And downstream of the radiator 13, the two air flows F1 and F2 separated by the flap 33 are obtained.

As in the first embodiment, the temperature of the first air flow F1 may be the same as or different than that of the second air flow F2.

Each of these steps of the method may be carried out for one or more zones ZG, ZD of the vehicle interior H.

It will therefore be understood that a control device 1 as described above allows independent temperature control for the first air flow F1 delivered via the first, defrosting 17a and/or ventilation 17b air outlets, which open out into a top region of the vehicle interior H, and for the second air flow F2 delivered via the second air outlet 19, which opens out in a bottom region of the vehicle at foot level. It is thus possible for the user themselves to set and choose the temperature they desire at the top and bottom for one zone of the vehicle interior or for each zone of the interior.

The invention described applies in particular to an installation for left right and/or front rear separation, allowing independent temperature control of the top and bottom regions of each zone ZG, ZD of the vehicle interior H.

The invention claimed is:

1. A control device for a heating, ventilation, or air-conditioning installation of a motor vehicle comprising an interior, said installation comprising an air treatment housing comprising:
at least two air outlets configured to open into a zone of the vehicle interior, including at least a first air outlet positioned at a top region of the interior of the motor vehicle and at least one second air outlet at a bottom region of the interior of the motor vehicle, wherein the bottom region is at foot level,
at least one first mixing member corresponding to the first air outlet and at least one second mixing member corresponding to the second air outlet, wherein the first mixing member is configured to mix an inlet air flow to produce a first air flow at an adjusted temperature bound for the first air outlet and the second mixing member is configured to mix the inlet air flow to produce a second air flow at an adjusted temperature bound for the second air outlet, wherein the adjusted temperature of the first air flow is different than the adjusted temperature of the second air flow,
a user interface configured to be arranged in the vehicle interior, comprising at least one first control member for setting the adjusted temperature of the first air flow bound for the first air outlet and at least one second control member for setting the adjusted temperature of the second air flow bound for the second air outlet, and
a control circuit configured to:
 receive, from each control member, an input signal with an individual temperature setpoint, and
 output separate control signals for controlling the first mixing member and the second mixing member, so as to independently adjust the temperature of the first air flow bound for the first air outlet and the second air flow bound for the second air outlet.

2. The device as claimed in claim 1, wherein the user interface is configured to be arranged in a vehicle interior having at least two zones, and comprises:
- at least two first control members for setting the temperature of the first air flow bound for at least one first air outlet for each zone of the vehicle interior, and
- at least two second control members for setting the temperature of the second air flow bound for at least one second air outlet for each zone of the vehicle interior.

3. The device as claimed in claim 1, wherein the control circuit is configured to output separate control signals for independent control of at least one first actuator for the first mixing member in a first mixing chamber of the air treatment housing and independent control of at least one second actuator for the second mixing member in a second mixing chamber of the air treatment housing.

4. The device as claimed in claim 1, wherein the first control member and the second control member are chosen from at least one setting knob, a touch screen, or a touch pad.

5. A heating, ventilation, or air-conditioning installation of a motor vehicle, comprising:
- an air treatment housing having at least two air outlets configured to open into a zone of an interior of the motor vehicle, including at least a first air outlet positioned at a top region of the interior of the motor vehicle and at least one second air outlet at a bottom region of the interior of the motor vehicle, wherein the bottom region is at foot level; and
- at least one first mixing member arranged in the air treatment housing and corresponding to the first air outlet and at least one second mixing member arranged in the air treatment housing and corresponding to the second air outlet,
wherein the first mixing member is configured to mix an inlet air flow to produce a first air flow at a first adjusted temperature bound for the first air outlet and the second mixing member is configured to mix the inlet air flow to produce a second air flow at a second adjusted temperature bound for the second air outlet,
wherein the first adjusted temperature is different than the second adjusted temperature and
wherein said installation has a control circuit as claimed in claim 1 for controlling the first mixing member and the second mixing member independently of one another, depending on an individual temperature setpoint, so as to deliver the first air flow at the first adjusted temperature bound for the first air outlet and the second air flow at the second adjusted temperature bound for the second air outlet.

6. The installation as claimed in claim 5, having at least one separating wall arranged in an air duct of the air treatment housing so as to separate the air duct into a first part having the first air outlet and a second part having the second air outlet, and wherein the first mixing member is arranged in the first part of the air duct and the second mixing member is arranged in the second part of the air duct.

7. The installation as claimed in claim 5, comprising:
- at least one first mixing chamber and at least one second mixing chamber, each comprising at least one member for mixing the air flow in order to produce an air flow at an adjusted temperature, and
- at least one first actuator for the first mixing member in the first mixing chamber of the air treatment housing, and at least one second actuator for the second mixing member in the second mixing chamber, wherein the first actuator and the second actuator are configured to be controlled independently of one another by the control circuit.

8. The installation as claimed in claim 7, comprising:
- a first communication member configured to place the first air outlet in communication with the first mixing chamber using a first communication actuator controllable by the control circuit; and
- a second communication member configured to place the second air outlet in communication with the second mixing chamber using a second communication actuator controllable by the control circuit.

9. A motor vehicle comprising an installation as claimed in claim 1.

10. A method for managing the temperature in a motor vehicle interior by way of a control device as claimed in claim 1, the method comprising:
- selecting, by way of a first control member, a first temperature of a first air flow to be delivered via a first air outlet associated with the first control member;
- selecting, by way of a second control member, a second temperature of a second air flow to be delivered via a second air outlet associated with the second control member, wherein the first temperature and the second temperature are different from one another;
- receiving a first input signal from the first control member and a second input signal from the second control member; and
- outputting a first control signal to the first mixing member to adjust the temperature of the first air flow bound for the first air outlet and outputting a second control signal to the second mixing member to adjust the temperature of the second air flow bound for the second air outlet.

* * * * *